March 29, 1938. W. A. EATON 2,112,484
VEHICLE CONTROL MECHANISM
Filed May 27, 1937 4 Sheets-Sheet 1

Inventor
Wilfred A. Eaton
By N. D. Parker Jr.
Attorney

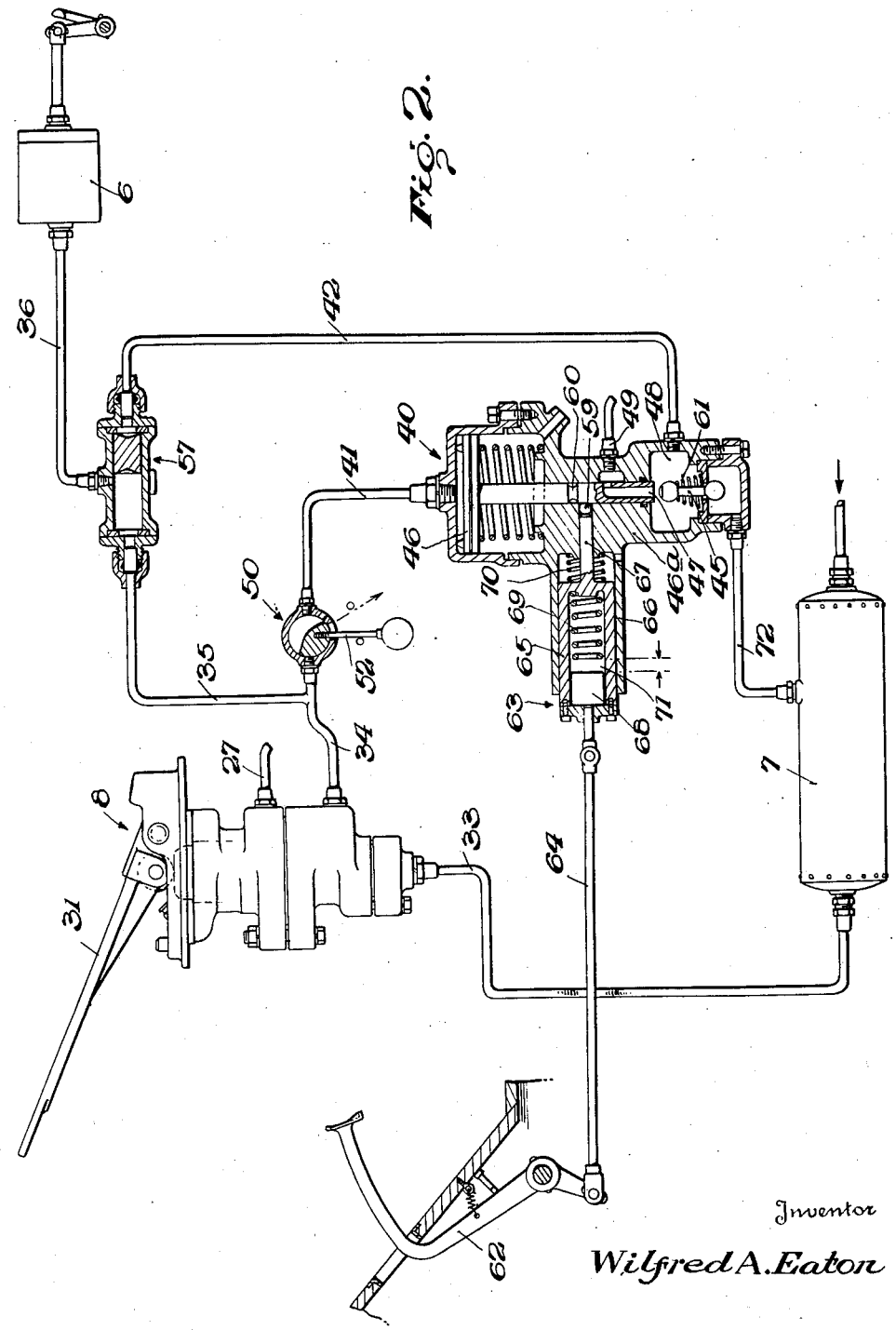

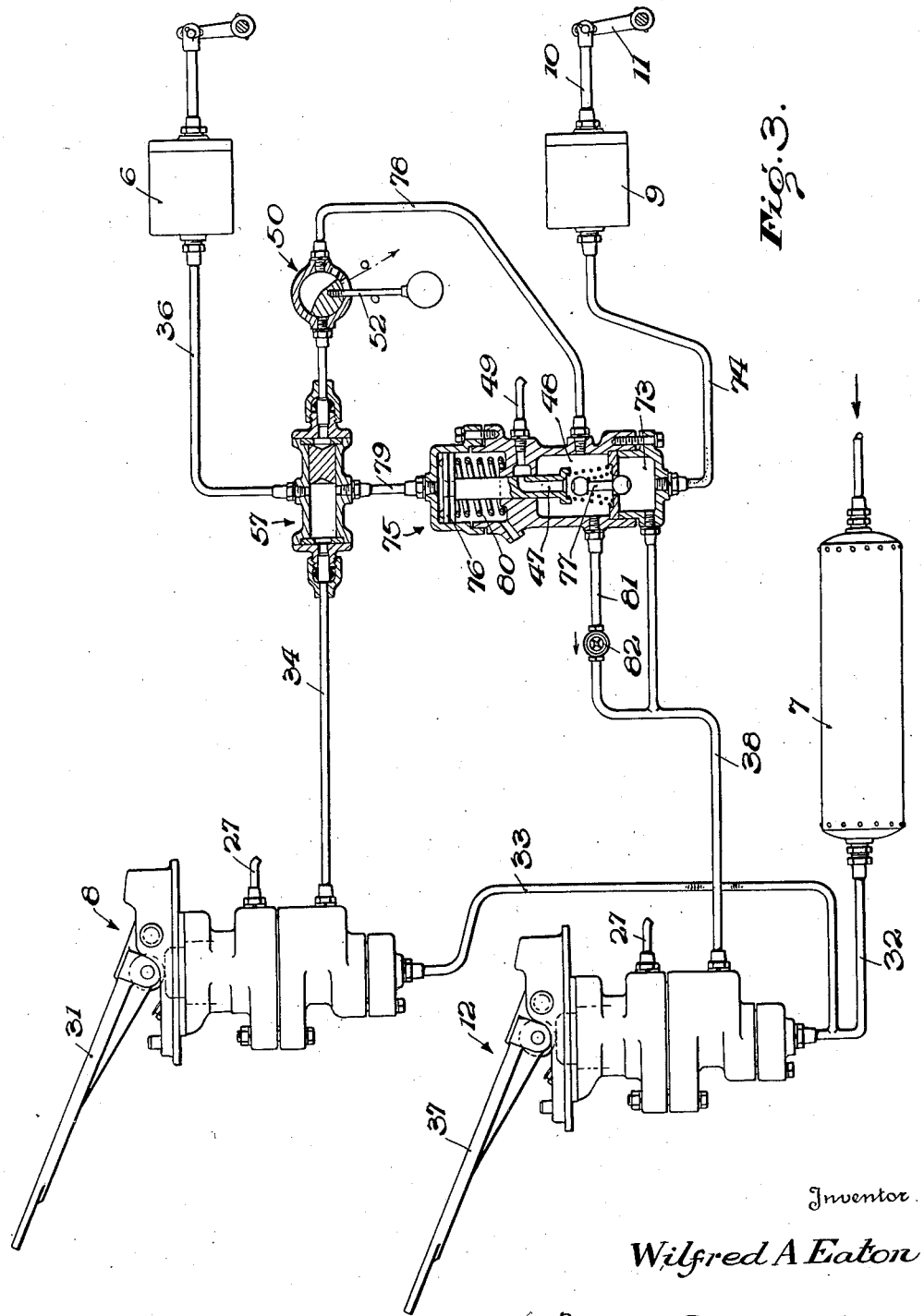

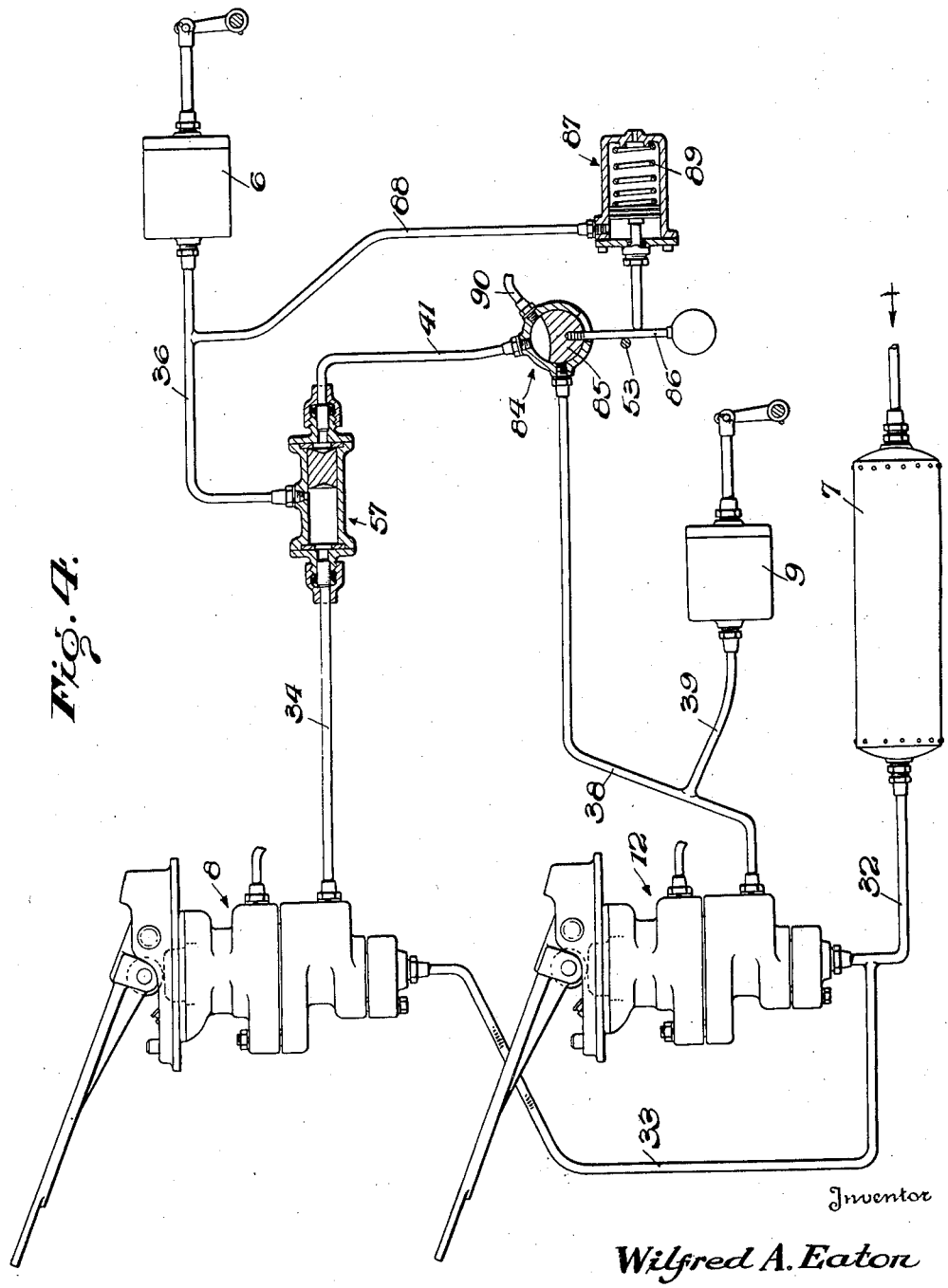

Patented Mar. 29, 1938

2,112,484

UNITED STATES PATENT OFFICE 2,112,484

VEHICLE CONTROL MECHANISM

Wilfred A. Eaton, Pittsburgh, Pa., assignor to Bendix-Westinghouse Automotive Air Brake Company, Pittsburgh, Pa., a corporation of Delaware Application May 27, 1937, Serial No. 145,139

17 Claims. (Cl. 192—13)

This invention relates to a mechanism for controlling motor vehicles and more particularly to an arrangement whereby the vehicle braking system may be automatically maintained in brake-applied position under certain conditions of vehicle operation.

One of the objects of the present invention is to provide a vehicle equipped with automatically-operable means for holding the brakes applied when the motion of the vehicle has been arrested on an incline, whereby the operator is relieved of the necessity of maintaining his foot upon the brake control pedal and may thus more efficiently start the vehicle from rest.

Another object is to provide a system of the above character which is especially adaptable for use in connection with fluid pressure-operated braking systems.

Still another object is to provide, in a vehicle control system having a fluid pressure braking mechanism, a novel arrangement enabling energization of the braking mechanism under the combined control of the vehicle clutch-operating device and the brake valve, the arrangement being such that the braking mechanism is maintained in applied position so long as the vehicle clutch device is energized and irrespective of release of the brake valve.

A further object is to provide, in a vehicle control system of the type including a fluid pressure braking system and a clutch, a novel construction for interlocking the operation of the clutch and braking system whereby the latter is energized during clutch disengagement provided the braking system has been initially energized in the usual manner.

A still further object is to provide a system of the above type which is especially adaptable in connection with fluid braking systems utilizing compressed air and which may be readily associated with existing systems of the latter character.

Other objects and novel features of the invention will appear more fully hereinafter from the following detailed description when taken in connection with the accompanying drawings, wherein several embodiments of the invention are illustrated. It is to be expressly understood, however, that the drawings are employed for purposes of illustration only and are not designed as a definition of the limits of the invention, reference being had for this purpose to the appended claims.

In the drawings, wherein similar reference characters refer to similar parts throughout the several views:

Fig. 2 is a diagrammatic view, partly in section, of a slightly modified form of the invention wherein the vehicle clutch is manually actuated;

Fig. 3 is a diagrammatic view, partly in section, of still another form of the invention, and Fig. 4 is a diagrammatic view, partly in section, of still a further modified form of the invention.

Figure 1:
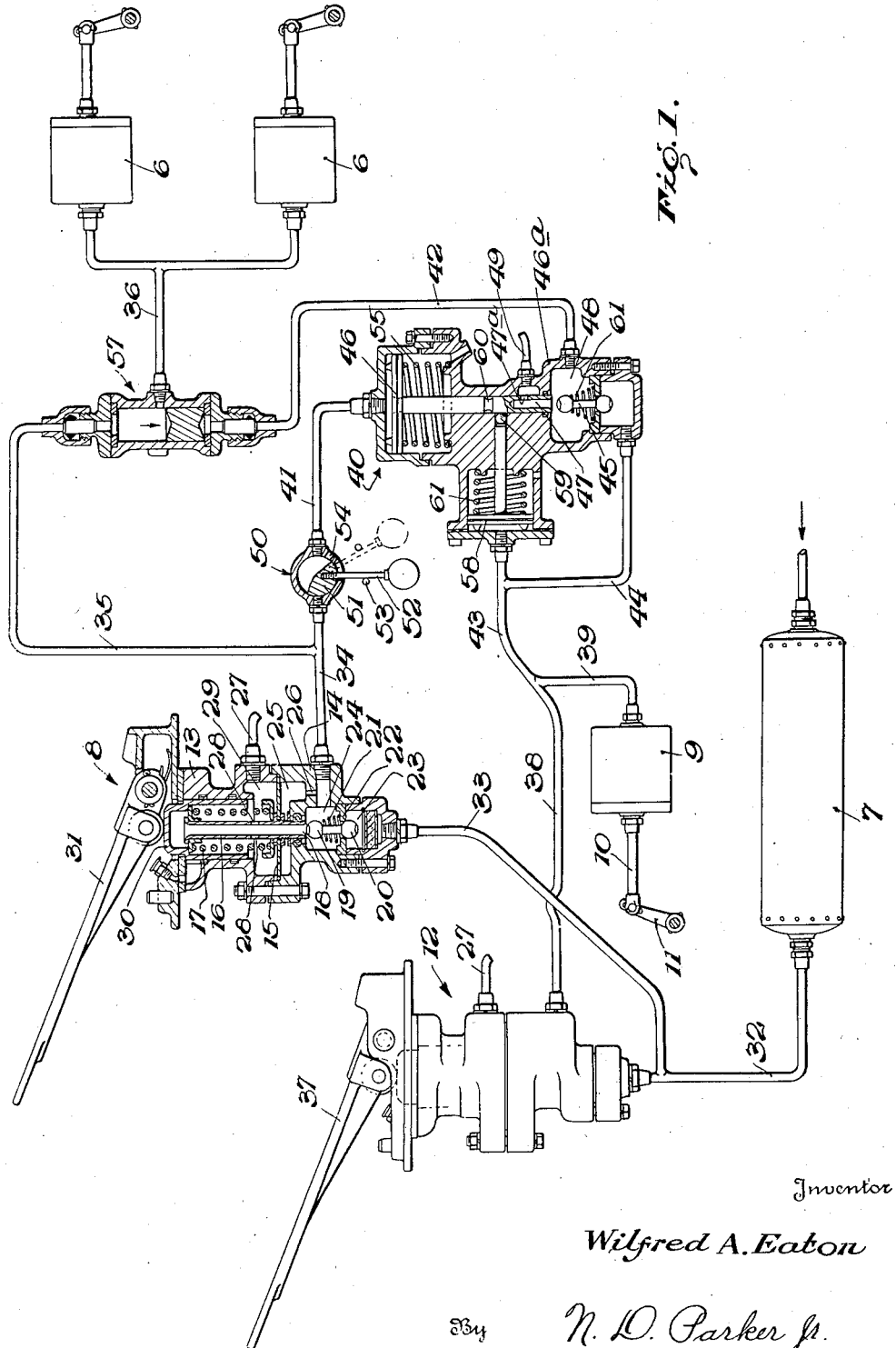
Fig. 1 is a diagrammatic view, partly in section, of a fluid pressure braking system constructed in accordance with the principles of the present invention.

Referring more particularly to Fig. 1, a fluid pressure controlling system constructed in accordance with the principles of the present invention is disclosed therein as embodying a pair of fluid pressure brake chambers 6 adapted to be supplied with fluid pressure from a reservoir 7 under the control of a manually-operable brake valve 8. Associated with the system is a fluid-operated clutch motor 9 having a movable element 10 connected to the vehicle clutch as by means of any suitable connection such as link 11, the clutch motor being adapted to be supplied with fluid pressure from reservoir 7 by a clutch-controlling valve 12 positioned adjacent the brake valve 8.

Since the valves 8 and 12 are of identical construction, one only will be described in detail. It is to be understood, moreover, that these valves may be constructed in any suitable manner but are preferably constituted as disclosed in the application of Andres and Sanford, Serial No. 57,411, filed January 3, 1936. Referring to valve 8, the same is of the self-lapping type and includes a pair of casing sections 13 and 14 between which a pressure-responsive diaphragm 15 is clamped. The diaphragm 15 carries a valve-operating assembly comprising a hollow stem 16, between the upper end of which and diaphragm 15 is positioned a precompressed spring 17. The lower end of the stem 16 is formed with an exhaust seat 18 normally spaced from but adapted to contact an exhaust valve 19, the latter being integrally connected with an intake valve 20. Valves 19 and 20 comprise a unitary structure adapted to be normally maintained in the position shown by means of a spring 21, the normal position of the valves being such that the intake valve 20 contacts a valve seat 22 thus cutting off communication between an intake chamber 23 and outlet chamber 24. As shown, fluid pressure from the latter chamber is conducted to a diaphragm chamber 25 through a restricted choke 26, this construction being provided in order that the pressure build-up in the diaphragm chamber 25 will be relatively slow. In the normal position of the valve, the outlet chamber 24 is connected with exhaust opening 27 through ports 28 positioned in the wall of the stem 16, such ports being in constant communication with an exhaust chamber 29.

A cap 30 slidably mounted in the upper casing section 13 cooperates with the valve in order to move the valve-actuating assembly constituted by spring 17, stem 16 and diaphragm 15 downwardly, for the purpose of controlling the flow of fluid pressure from the intake chamber 23 to the outlet chamber 24. Any suitable actuating mechanism, such as pedal 31, may be provided for actuating the cap 30.

It will be readily understood from the aforementioned description that, during initial actuation of the pedal 31, the stem 16 is moved downwardly to contact exhaust valve 19 and open the intake valve 20. Fluid pressure thereupon is conducted from the reservoir 7 to the intake chamber 23, by way of conduits 32 and 33 and thence to the outlet chamber 24 which is connected to the brake chamber 6 by way of conduits 34, 35 and 36. The build-up of pressure in the brake chamber 6 will be relatively rapid due to the relatively slow build-up of pressure within the diaphragm chamber 25 which, as heretofore stated, communicates with the outlet chamber 24 by way of the restricted passage 26. However, as soon as the pressure build-up in chamber 25 balances the initial pressure upon pedal 31 and the precompression of spring 17, the diaphragm 15 will be moved upwardly a sufficient amount to permit intake valve 20 to close. The valve in this position will be lapped and will maintain a predetermined pressure in the brake chamber 6. Further increments of movement of the pedal 31 will serve to build up the pressure in brake chamber 6 by proportionate amounts, it being noted that the construction is such that maximum depression of the pedal 31 will serve to maintain intake valve 20 open in order to permit full reservoir pressure to be conducted to the braking system.

For the purpose of controlling the application of fluid pressure to the clutch motor 9 in order to graduate the disengaging and engaging movements of the vehicle clutch, it has heretofore been stated that a valve 12, similar to the brake valve 8, is provided. This valve includes an operating pedal 37, conveniently positioned adjacent the brake valve 8 in a well-known manner. In operation, the clutch valve 12 serves to control the application and release of fluid pressure to and from the clutch motor by way of conduits 32, 38 and 39.

Fluid pressure braking systems and fluid pressure-operated clutch control systems of the general type heretofore described have always been separately operated in order to respectively control the brakes and the clutch of motor vehicles. By the present invention, these two systems are so interrelated that, under certain conditions, operation of the clutch-controlling valve will not only serve to control the vehicle clutch in the usual manner but will also serve to supply fluid pressure to the brake chamber 6. Such an arrangement is highly desirable since it relieves the operator from the necessity of maintaining his foot upon the brake valve preparatory to starting the vehicle in first gear, after the motion of the vehicle has been arrested in traffic.

In order to accomplish the foregoing, the fluid pressure brake and clutch systems are interrelated by a transfer valve mechanism 40 associated with the braking system by conduits 41 and 42 and with the clutch system by conduits 43 and 44. More particularly, the transfer valve mechanism includes a valve 45 contained within a housing 46a and serving to normally obstruct the flow of fluid pressure from conduit 44 to conduit 42. The construction is such, however, that said valve may be moved to open position to connect said last two named conduits by movement of a pressure-responsive device 46, the latter being provided at its lower end with an exhaust passage 47 connecting an outlet chamber 48 and conduit 42 to atmospheric connection 49 through port 47a, when the parts are in the position shown. Preferably, the flow of fluid pressure to the element 46 through conduit 41 is controlled by a gravity-operated valve 50, this construction being provided in order to prevent interlocking between the clutch and brake systems except when the vehicle is on a slight upgrade. The valve 50 includes a gravity-actuated valve element 51 having a weighted arm 52 secured thereto, and, when the vehicle is level, the arm 52 engages a stop 53 thus obstructing the flow of fluid from conduit 34 to conduit 41. However, when the vehicle is positioned upon a slight upward incline, the arm 52 takes the dotted-line position and thus moves the valve 51 to such a position as to establish communication between conduits 34 and 41. To prevent fluid pressure from leaking past valve 51 from conduit 34 to conduit 41, an exhaust port 54 is placed in the wall of the valve 50.

In order that pressure-responsive element 46 will be moved to open valve 45 only when substantially maximum braking pressure exists in the braking system, the said element is normally maintained in the position shown as by means of a preloaded spring 55, the amount of preloading of said spring being such that the element 46 is moved only to a position where valve 45 is opened when substantially maximum braking pressure exists in the braking system. When the valve 45 is thus operated, it will be readily understood that fluid pressure will be conducted to the braking system upon operation of the clutch valve 12 and release of the brake valve 8, a double check valve 57, of well-known construction, being provided at the junction between conduits 35, 42 and 36 in order to permit fluid to flow to the brake chambers from either conduit 35 or 42.

Means are provided for maintaining the valve 45 in open position during operation of the clutch valve 12, and, as shown, such means are constituted by a pressure-responsive element 58 effective under the influence of fluid pressure in conduit 43 to latch the pressure-responsive element 46 in its lower position through cooperation of ball 59 and groove 60. Preferably, the element 58 is maintained in its inoperative position as by means of a preloaded spring 61, the extent of preloading of the spring being such that substantially maximum operation of the clutch valve 12 and the consequent build-up of a substantially maximum pressure in conduit 43 will be necessary before element 58 is moved to its latching position where ball 59 cooperates with groove 60.

From the foregoing, it will be readily apparent that, in the event the operator finds it necessary to stop the vehicle in traffic, he depresses the brake and clutch valves 8 and 12 respectively in the usual manner and thus effects an application of the vehicle brakes as well as a disengagement of the vehicle clutch. Provided the vehicle is on a slight upgrade, fluid pressure from the brake conduit 34 will be conducted to the pressure-responsive element 46 of the transfer valve mechanism 40, and, if the braking pressure is sufficient to overcome the precompression of spring 55, the element 46 will be moved to open the valve 45. Fluid pressure from the clutch conduit 44 will thereupon be conducted by way of conduit 42 to the double check valve 57, and, when the operator removes his foot from the brake valve 8, thus exhausting conduits 35 and 34, the fluid pressure in conduit 42 will operate the check valve 57 in such a manner as to connect said conduit with the brake chamber 6 by way of check valve 57 and conduit 36. It will also be observed that, notwithstanding the release of pressure from conduits 34, 35 and 41, due to exhausting the brake valve 8, the pressure-responsive element 46 will not be moved upwardly under the influence of spring 55 to release the valve 45 by reason of the operation of the latching element 58. This element is maintained in such a position as to hold the element 46 in valve-operating position so long as substantially maximum pressure exists in the clutch conduit 43.

When it is desired to again start the vehicle in gear, it is necessary only to release the clutch valve 12 which effects not only a release of the vehicle brakes but also a graduated engagement of the vehicle clutch. This will be readily understood when it is considered that, as soon as the pressure in the clutch conduit 43 has been released to such an extent that the spring 51 moves the latching element 58 to its unlatched position, the element 46 will be moved upwardly, thus opening the exhaust passage 47 and permitting the brake chamber 6 to be exhausted to atmosphere by way of conduit 36, double check valve 57, conduit 42 and chamber 48. The valve 45 is then moved to such a position under the influence of spring 61 as to close communication between conduit 44 and chamber 48. Preferably, the pressure existing in conduit 43 at the time the element 46 is moved to its upward position is greater than that at which the vehicle clutch initially engages. Consequently, the remaining graduation of pressure release in conduits 38, 39 and clutch motor 9 through subsequent operation of the clutch valve 12 will serve to nicely graduate the engagement of the clutch to the end that efficient operation of the latter will occur during starting of the vehicle. Thus, with the above described arrangement, the vehicle may be held in braked position by means of operation of the clutch valve alone and may be started in gear without the possibility of any backward movement of the vehicle when it is desired to move the same forwardly.

Referring more particularly to Fig. 2, the invention illustrated therein is similar to that shown in Fig. 1 with the exception that a manually-operable clutch is disclosed in place of a fluid pressure-operated clutch. As shown, the vehicle clutch is controlled by a clutch pedal 62, the latter being connected to a latching device 63 by means of link 64. The device 63 includes a housing 65 slidably received in a portion 66 of the casing 46a, the said housing being provided with an extension 67 for moving the ball 59 into latching engagement with the groove 60. Link 64 is slidably received in the end of the housing 65 and is provided with an enlarged end 68 normally spaced from but adapted to engage a spring 69. The housing 65 is normally maintained in the position shown as by means of a spring 70. The distance between the end 68 of the link 64 and the adjacent end of spring 69 is denoted by the reference numeral 71 and constitutes a lost motion connection which enables complete disengagement of the vehicle clutch prior to the end 68 contacting the spring 69.

In the operation of the foregoing arrangement, it will be understood that, upon simultaneous operation of the brake valve 8 and clutch pedal 62, the brakes will be applied in the manner heretofore described in connection with Fig. 1, and the vehicle clutch disengaged. In the event that the vehicle is on a slight upward incline, valve 50 will serve to conduct the braking pressure from conduit 34 to the transfer valve mechanism 40 by way of conduit 41. Operation of the pressure-responsive element 46 under such conditions will open valve 45, thus establishing communication between conduit 42 and reservoir 7 past open valve 45 and conduit 72. Fluid under pressure will thus be available in conduit 42 for application to the brake chamber 6 as soon as the brake valve 8 is moved to exhaust position and the double check valve 57 moves to establish communication between conduits 42 and 36. Such fluid under pressure will be maintained in the brake chamber 6 as long as the clutch pedal 62 is kept in depressed position, it being understood that the latch mechanism 59 and 60 through movement of housing 65 to the right, as viewed in Fig. 2, will be effective to latch the element 46 in its downward position and maintain the valve 45 open.

As soon as the operator desires to start the vehicle, it is necessary only to release pressure upon the clutch pedal 62 whereupon the action of spring 70 will move housing 65 to the left and release the latching device 59, 60. This occurs when end 68 of link 64 still contacts spring 69, and, as heretofore stated, at this position of the parts, the clutch has not yet started to engage. Release of the latching mechanism 59, 60 will serve to release the pressure-responsive element 46 whereupon the fluid pressure in the brake chamber 6 is exhausted by way of conduit 36, double check valve 57, conduit 42, chamber 48 and exhaust opening 47. The remaining return movement of the clutch pedal 62, an amount represented by the lost motion connection 71, will be effective to graduate the engagement of the vehicle clutch.

Referring to Fig. 3, the fluid pressure braking and clutch systems are interrelated by a slightly modified form of transfer valve mechanism. As shown, the brake valve 8 is adapted to control the flow of fluid pressure from reservoir 7 to the brake chamber 6 by means of conduits 32, 33, 34, double check valve 57 and conduit 36. The clutch-operating valve 12 is adapted to control the flow of fluid pressure to the clutch motor 9 as by means of conduit 32, conduit 38 leading to a valve chamber 73 and a conduit 74 connecting the latter with the clutch motor 9.

The interlocking between the clutch and braking systems is secured in this modification of the invention by means of a transfer valve mechanism 75 housing a pressure-responsive element 76 which is effective to control a valve 77. The latter, when operated, controls the flow of fluid pressure from conduit 38 to conduit 78, the latter being connected to the double check valve 57 through the gravity-controlled valve 50. In this form of the invention, the clutch pedal-operated latching device is dispensed with and the pressure-responsive element 76 is maintained in valve-operating position by means of fluid pressure conducted from conduit 78 to conduit 79 when the double check valve 57 has moved to the left, as viewed in Fig. 3. As soon as pressure has been conducted to the element 76 in the manner above described, the latter is maintained in such a position as to keep valve 77 open, and the parts occupy these positions until the pressure in conduit 79 is relieved to such an extent that the preloaded spring 80 is capable of moving the element 76 to its valve-releasing position. Preferably, the preloading of spring 80 is such that substantially maximum pressure in conduit 79 is required to maintain the element 76 in its valve-operating position. Thus, when clutch valve 12 has begun to exhaust the clutch conduit 38, element 76 will be moved to exhaust conduit 78, thus releasing the vehicle brakes, prior to the initiation of clutch engagement. The remaining exhaust movement of the clutch valve 12 will thus serve to nicely graduate engagement of the vehicle clutch.

It will be appreciated that, as soon as element 76 is moved to valve-releasing position, conduit 78 exhausts to the atmospheric connection 49 by way of chamber 48 and exhaust port 47. In the event that a quick release of the brakes is desired, a supplemental conduit 81 connecting chamber 48 and conduit 38 may be provided, a one-way check valve 82 being interposed in this conduit for enabling flow of fluid from the chamber 48 to conduit 38 only. Thus, initial exhausting of conduit 78 may take place through the clutch valve 12 by way of conduit 81.

Referring now to Fig. 4, there is disclosed therein a somewhat simplified arrangement for interlocking the clutch and brake systems previously described. Therein, the two systems are interlocked by means of a gravity-operated valve mechanism 84 associated with the brake conduit 41 and with the clutch conduit 38. This mechanism includes a valve 85 adapted to be operated by a weighted arm 86, said arm being normally maintained against stop 53, as shown, by means of a fluid pressure-operated stop mechanism 87. Fluid pressure for operating the stop mechanism is obtained from the conduit 36 by way of conduit 88, and, preferably, a preloaded spring 89 is associated with the stop mechanism 87 for the purpose of preventing release movement of the latter except in the event that maximum braking pressure exists in conduits 36 and 88.

In operation of the above described arrangement, it will be observed that, when the vehicle is level or proceeding downgrade, the valve 85 remains in such position as to disconnect the clutch conduit 38 and the brake conduit 41 irrespective of the release of the stop mechanism 87 when maximum braking pressure is applied to the braking chamber 6 through operation of the brake valve 8. However, in the event the vehicle is on a slight incline, and both clutch and brake valves 12 and 8 respectively are operated to their fullest extent, the latch mechanism 87 will be moved to such a position as to enable the weighted arm 86 to open valve 85. Thus, conduits 38 and 41 will be interconnected, and, as soon as the brake valve 8 begins to move to exhaust position, the check valve 57 will connect conduits 41 and 36, thus conducting fluid pressure from the clutch conduit 38 to the brake chamber 6. At the same time, fluid pressure from conduit 36 will be led to the stop mechanism 87 through conduit 88 and thus, as long as valve 12 is operated to maintain maximum pressure in not only the clutch motor 9 but also the brake chamber 6, the stop mechanism 87 will be rendered inoperative.

When it is desired to release the brakes and reengage the clutch, release of pressure in the system through operation of clutch valve 12 will reduce the pressure in conduit 88, whereupon stop mechanism 87 will be moved to such a position as to connect conduit 41 through exhaust opening 90 of the valve 84. Subsequent release of the clutch valve 12 will serve to exhaust the clutch motor 9 for the purpose of securing graduated clutch engagement.

There have thus been provided by the present invention several arrangements for maintaining the brake system of a vehicle charged with fluid pressure by manipulation of the clutch pedal. Such structures enable the operator to remove his foot from the brake valve for use with the accelerator when forward motion of the vehicle is resumed, thus eliminating the possibility of the vehicle rolling back upon release of the brakes on a hill. The provision of the transfer valve mechanism in the structure described enables fluid pressure to be conducted from the clutch system to the brake system in response to a predetermined pressure existing in the latter, thus maintaining the brakes applied by a relatively simple arrangement. It will be also appreciated that, though the invention provides an efficient interlock between the clutch and brake systems, yet the various constructions are such that the brakes will be released and the clutch gradually engaged for the purpose of rendering the starting of the vehicle smooth.

While several embodiments of the invention have been illustrated and described herein, it is to be understood that the same is not limited thereto but may be embodied in various forms, as will be clear to those skilled in the art. Reference will, therefore, be had to the appended claims for a definition of the limits of the invention.

What is claimed is:

1. In a motor vehicle provided with a fluid pressure braking system and a clutch device, a source of fluid pressure, a brake chamber, a fluid pressure-operated clutch motor, means including a valve for connecting said source and chamber to apply the brake in service, means including a separate valve for connecting said source and motor to operate said clutch device, and means including a device responsive to the pressure of the fluid supplied to the brake chamber for connecting the latter with said separate valve.

2. In a motor vehicle provided with a fluid pressure braking system and a clutch device, a source of fluid pressure, a brake chamber, a fluid pressure-operated clutch motor, means including a valve for connecting said source and chamber to apply the brake in service, means including a separate valve for connecting said source and motor to operate said clutch device, and means for connecting said brake chamber with said separate valve whereby operation of the latter will conduct fluid pressure to said brake chamber and clutch motor.

3. In a motor vehicle provided with a fluid pressure braking system and a clutch device, a source of fluid pressure, a brake chamber, a fluid pressure-operated clutch motor, means including a valve for connecting said source and chamber to apply the brake in service, means including a separate valve for connecting said source and motor to operate said clutch device, and means for maintaining the brakes applied upon actuation of said separate valve including a connection between the brake chamber and separate valve together with means operable by fluid pressure supplied said brake chamber upon operation of said first valve for controlling said connection.

4. In a motor vehicle provided with a fluid braking system and a clutch device, a source of fluid pressure, a brake chamber, a clutch motor, a brake valve for controlling the application of fluid pressure from said source to said chamber, a clutch valve for controlling the flow of fluid pressure from said source to the motor, means for connecting the clutch valve and chamber including a valve mechanism movable to open position by application of fluid pressure to the chamber upon operation of the brake valve, and connections for maintaining said valve mechanism open irrespective of movement of the brake valve to exhaust position.

5. In a motor vehicle provided with a fluid braking system and a clutch device, a source of fluid pressure, a brake chamber, a brake valve for supplying fluid pressure from said source to said chamber, and means operable to connect said source and brake chamber upon energization of said clutch device including a mechanism responsive to the pressure of the fluid supplied to the brake chamber by operation of the brake valve.

6. In a motor vehicle provided with a fluid braking system and a clutch device, a source of fluid pressure, a brake chamber, a brake valve for supplying fluid pressure from said source to said chamber, and means operable to connect said source and brake chamber upon energization of said clutch device including a valve mechanism movable to open position by the pressure of the fluid supplied to the brake chamber upon operation of the brake valve.

7. In a motor vehicle provided with a fluid braking system and a clutch device, a source of fluid pressure, a brake chamber, a brake valve for supplying fluid pressure from said source to said chamber, means operable to connect said source and brake chamber upon energization of said clutch device including a valve mechanism movable to open position by the pressure of the fluid supplied to the brake chamber upon operation of the brake valve, and connections for maintaining said valve mechanism open irrespective of movement of the brake valve to exhaust position.

8. In a motor vehicle provided with a fluid braking system and a clutch device, a source of fluid pressure, a brake chamber, a brake valve for supplying fluid pressure from said source to said chamber, means for connecting the source and brake chamber separate from said brake valve, said last named means being controlled by the pressure of the fluid supplied the brake chamber when the brake valve is operated, and means controlled by the energization of the clutch device for maintaining said connecting means operative to connect the source and brake chamber irrespective of movement of the brake valve to exhaust position.

9. In a motor vehicle provided with a fluid braking system and a clutch device, a source of fluid pressure, a brake chamber, a clutch motor, a brake valve for controlling the application of fluid pressure from said source to said chamber, a clutch valve for controlling the flow of fluid pressure from said source to the motor, means for connecting the clutch valve and chamber including a valve mechanism movable to open position by application of fluid pressure to the chamber upon operation of the brake valve, and means subject to the pressure of the fluid supplied by operation of the clutch valve for maintaining said valve mechanism open irrespective of movement of the brake valve to exhaust position.

10. In a motor vehicle provided with a fluid braking system and a clutch device, a source of fluid pressure, a brake chamber, a brake valve for supplying fluid pressure from said source to said chamber, means operable to connect said source and brake chamber including a valve mechanism movable to open position when fluid pressure is supplied to the brake chamber upon operation of the brake valve, and connections operable upon energization of said clutch device for maintaining said valve mechanism open irrespective of movement of the brake valve to exhaust position.

11. In a motor vehicle having a fluid pressure braking system and a fluid pressure-operated clutch system, means to control the braking system to apply the brakes, means to control the clutch system to operate the vehicle clutch, and means to hold the brakes applied during operation of said second control means, said holding means including a valve device movable in response to a predetermined pressure in the braking system.

12. In a motor vehicle provided with a fluid braking system and a clutch device, a source of fluid pressure, a brake chamber, a brake valve for supplying fluid pressure from said source to said chamber, a separate valve for supplying fluid pressure from said source to said chamber, a pressure-responsive element for moving said separate valve to open position, means for subjecting said element to the pressure of the fluid supplied by said brake valve, and means dependent upon energization of the clutch device for maintaining said separate valve open irrespective of movement of the brake valve to exhaust position.

13. In a motor vehicle provided with a fluid braking system and a clutch device, a source of fluid pressure, a brake chamber, a brake valve for supplying fluid pressure from said source to said chamber to apply the brakes, and means dependent upon energization of said clutch device for holding the brakes applied, said last named means including a valvular mechanism initially moved to open position upon operation of the brake valve for connecting said source to the brake chamber independently of the brake valve.

14. In a motor vehicle provided with a fluid pressure braking system and a clutch device, a source of fluid pressure, a brake chamber, a fluid pressure-operated clutch motor, means including a valve for connecting said source and chamber to apply the brake in service, means including a separate valve for connecting said source and motor to operate said clutch device, means including a device responsive to the pressure of the fluid supplied to the brake chamber for connecting the latter with said separate valve, and means for subjecting said device to the pressure of the fluid supplied by said separate valve to maintain the connection between the latter and the brake chamber.

15. In a motor vehicle provided with a fluid pressure braking system and a clutch device, a source of fluid pressure, a brake chamber, a fluid pressure-operated clutch motor, means including a valve for connecting said source and chamber to apply the brake in service, means including a separate valve for connecting said source and motor to operate said clutch device, means including a device responsive to the pressure of the fluid supplied to the brake chamber for connecting the latter with said separate valve, said last named means including also a gravity-operated valvular mechanism, and means for subjecting said device to the pressure of the fluid supplied by said separate valve to maintain the connection between the latter and the brake chamber.

16. In a motor vehicle provided with a fluid braking system and a clutch device, a source of fluid pressure, a brake chamber, a brake valve for supplying fluid pressure from said source to said chamber to apply the brakes, and means dependent upon energization of said clutch device for holding the brakes applied, said last named means including a gravity-operated valvular mechanism and means responsive to a predetermined fluid pressure admitted by said brake valve cooperating therewith.

17. In a motor vehicle having a fluid pressure braking system and a fluid pressure-operated clutch system, means to control the braking system to apply the brakes, means to control the clutch system to operate the vehicle clutch, and means to hold the brakes applied during operation of said second control means, said holding means including a gravity-operated valve device controlled by a predetermined pressure in the braking system.

WILFRED A. EATON.